US006712368B2

(12) United States Patent
Bohn et al.

(10) Patent No.: US 6,712,368 B2
(45) Date of Patent: Mar. 30, 2004

(54) QUICK ATTACHMENT RELEASE SYSTEM FOR A ROTARY HAND TOOL

(75) Inventors: James Bohn, Racine, WI (US); Jose Nieto, Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 127 days.

(21) Appl. No.: 10/007,995

(22) Filed: Nov. 8, 2001

(65) Prior Publication Data

US 2003/0085534 A1 May 8, 2003

(51) Int. Cl.[7] .................................................. B23C 1/20

(52) U.S. Cl. ........................... 279/143; 30/500; 279/22; 409/182

(58) Field of Search ............................ 279/22, 30, 143, 279/144, 145, 79, 80; 409/182, 181; 30/500; 144/136.95, 154.5; 403/322.2, 328, 383, DIG. 6; 464/182; 408/241 R, 241 A, 20, 26; 451/415

(56) References Cited

U.S. PATENT DOCUMENTS

| | | | | | |
|---|---|---|---|---|---|
| 2,282,728 | A | | 5/1942 | Kern | |
| 2,536,017 | A | * | 1/1951 | Bamberger | 464/178 |
| 2,548,411 | A | * | 4/1951 | Vache | 74/57 |
| 2,808,085 | A | * | 10/1957 | Hollien et al. | 408/234 |
| 3,009,493 | A | | 11/1961 | Dodegge | |
| 3,724,237 | A | | 4/1973 | Wood | |
| 3,759,336 | A | | 9/1973 | Marcovitz et al. | |
| 4,184,692 | A | | 1/1980 | Benson et al. | |
| 4,234,277 | A | | 11/1980 | Benson et al. | |
| 4,818,157 | A | | 4/1989 | Kouvelis | |
| 4,824,298 | A | * | 4/1989 | Lippacher et al. | 279/75 |
| 4,924,578 | A | | 5/1990 | Chagnon et al. | |
| 4,949,463 | A | * | 8/1990 | Chen | 30/500 |
| 5,033,552 | A | | 7/1991 | Hu | |
| 5,180,261 | A | * | 1/1993 | Schreiber | 279/145 |
| 5,342,154 | A | * | 8/1994 | Holzer | 279/143 |
| 5,643,062 | A | | 7/1997 | Joseph et al. | |
| 5,829,931 | A | * | 11/1998 | Doumani | 409/132 |
| 5,951,026 | A | * | 9/1999 | Harman, Jr. et al. | 279/143 |
| 6,244,796 | B1 | * | 6/2001 | Schuebel et al. | 409/180 |
| 6,536,782 | B2 | * | 3/2003 | Rohm | 279/75 |
| 2003/0044252 | A1 | * | 3/2003 | Landt | 409/182 |
| 2003/0077136 | A1 | * | 4/2003 | Rohm | 279/75 |

* cited by examiner

*Primary Examiner*—Daniel W. Howell
(74) *Attorney, Agent, or Firm*—Greer, Burns & Crain, Ltd.

(57) ABSTRACT

A quick release attachment tool where the rotary tool has a housing which encloses a motor with the housing having a central axis, a non-operational end portion and an operational end portion. A nose portion is formed at the operational end portion, and the nose portion has an outer annular groove disposed generally perpendicularly to the axis. The nose portion also has a non-circular element at the outer end thereof coaxial with the central axis. A rotatable shaft is connected to the motor and located along the central axis. The attachment tool includes a central cavity, an attachment end portion and a working end portion. A non-circular mating element is formed in the central cavity that matingly engages the non-circular element of the rotary tool. There is also a biased connection element provided on the attachment tool, which faces the central cavity. This biased connection element engages the annular groove of the nose portion when the attachment tool is fitted onto the rotary tool.

18 Claims, 10 Drawing Sheets

QUICK ATTACHMENT RELEASE SYSTEM FOR A ROTARY HAND TOOL

BACKGROUND OF THE INVENTION

The present invention generally relates to power hand tools and more particularly to a power hand tool with a quick attachment release system.

Small rotary hand tools have been marketed for many years for use in carrying out woodworking and metal working tasks by hobbyists as well as commercial artisans. An example of such is produced by Dremel, which also produces many accessories for these rotary hand tools. Such small rotary hand tools are generally cylindrical in shape, and have a motor unit with a rotary output shaft that is adapted to connect to a number of accessories. The drive unit of many recent models of such rotary hand tools is relatively small, lightweight and capable of being easily used. The tool has a small but powerful electric motor that is capable of driving an output shaft at high speed, and a rotary implement can be typically attached to the tool's output shaft, which is axially aligned with the length of the tool.

There are several accessory attachments such a flexible cable, a grout removal guide or cutting guide, a chain saw sharpener among others, which are attached directly on the rotary hand tool for use. It is the current practice to attach these accessories by threadably mounting them onto the rotary hand tool. The problem with this method is that it is inconvenient and takes more time than is desired to screw the accessory on and off the rotary tool. Another disadvantage is that the accessory attachment often tends to rotate relative to the tool body during use or is not properly aligned for effective performance.

Accordingly, it is a primary object of the present invention to provide an improved rotary hand tool that includes a quick release attachment system that allows users to snap-fit an accessory attachment onto the rotary hand tool, yielding a quick engage/disengage feature.

Another object of the present invention is to provide an improved rotary hand tool that prevents rotation of the accessory attachment relative to the tool body during use and precisely aligns it for effective performance.

BRIEF SUMMARY OF THE INVENTION

The above-listed objects are met or exceeded by the present rotary hand tool with quick release attachment system, which features a snap-fit connection between the rotary hand tool and accessory attachments. A spring-loaded ball in a mating attachment engages a groove on the rotary hand tool, which yields a quick engage/disengage feature.

Another feature of the present rotary hand tool with quick release attachment system is a keying feature in the nose end portion of the rotary hand tool, which prevents the attachment from rotating relative to the tool body during use and precisely aligns it for effective performance. A non-circular shaped extension, which may include any polygonal, oval, or star shape, is configured on the nose of the tool, which mates with a complementary non-circular shape opening in the mating attachment. This prevents rotation of the mating attachment relative to the body of the tool.

More specifically, the present invention provides a rotary tool with a quick release attachment capability. The rotary tool has a housing that encloses a motor, and the housing has a central axis, a non-operational end portion and an operational end portion. There is a nose portion formed at the operational end portion, and the nose portion has an outer annular groove disposed generally perpendicularly of the axis. The nose portion also has a non-circular element at the outer end thereof parallel with the central axis. A rotatable shaft is connected to the motor and is located along the central axis.

The accessory attachment includes a central cavity, a mating and connection end portion and a working end portion. A non-circular mating element is formed in the central cavity that matingly engages the non-circular element of the rotary tool. There is also a biased mating and connection element provided on the accessory attachment, which faces the central cavity. This biased mating and connection element engages the annular groove of the nose portion when the accessory attachment is fitted onto the rotary tool.

DETAILED DESCRIPTION OF THE INVENTION

Figure 1:
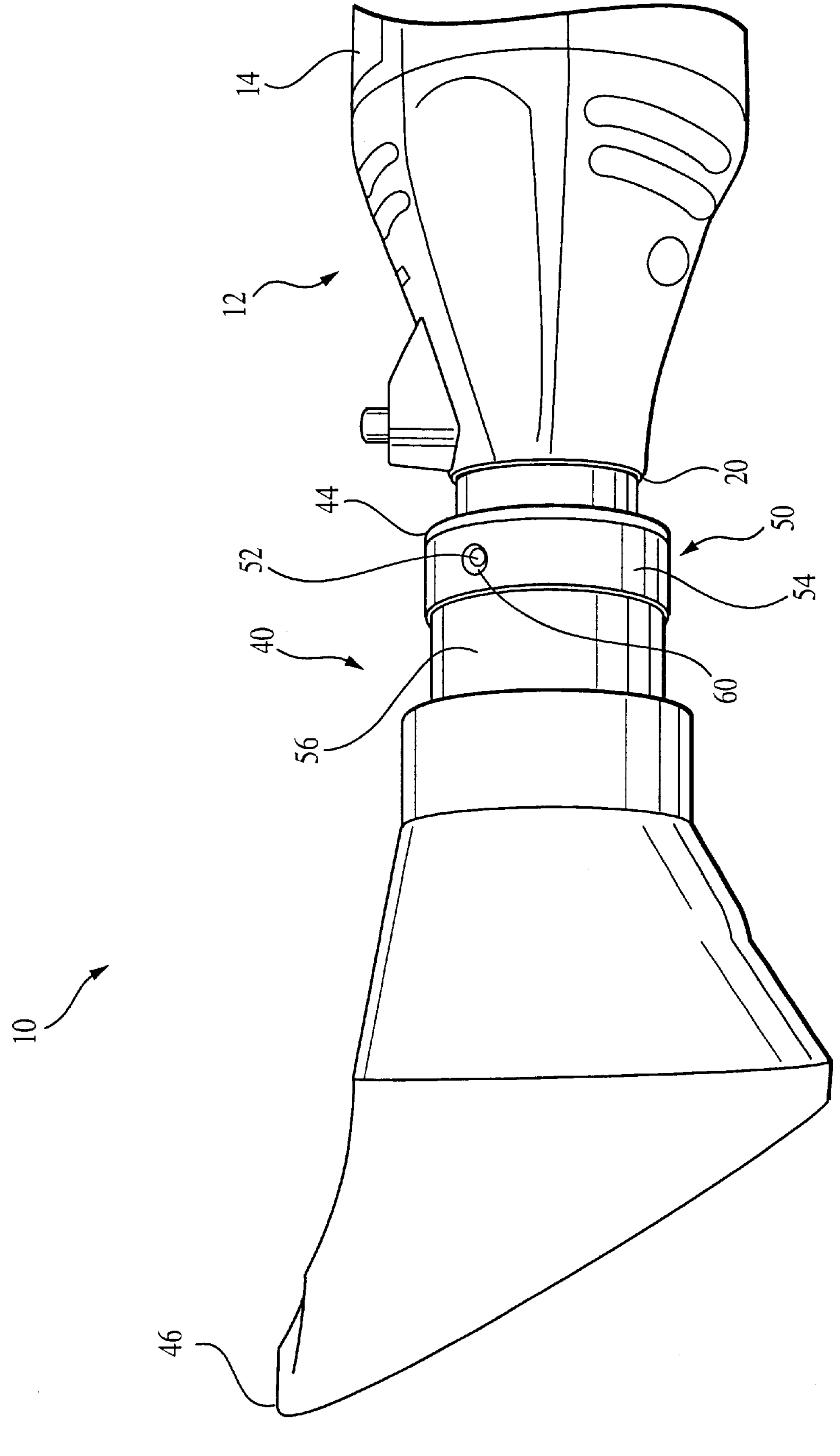
FIG. 1 is a predominately perspective view of the rotary hand tool connected with the accessory attachment, embodying the present invention, which in this drawing is a grout removal guide.
Figure 2:
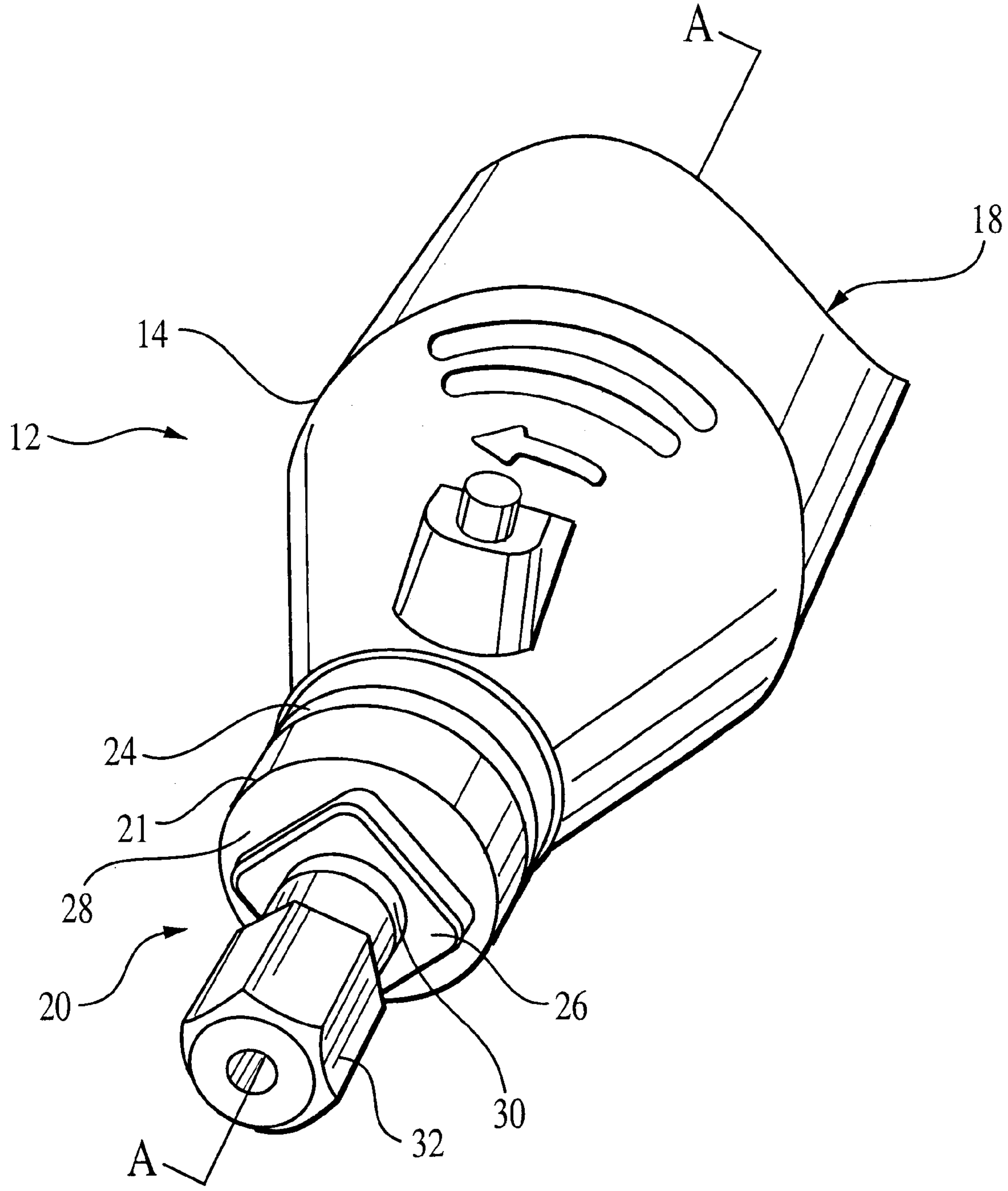
FIG. 2 is a predominately front perspective view of the rotary hand tool shown in FIG. 1.
Figure 3:
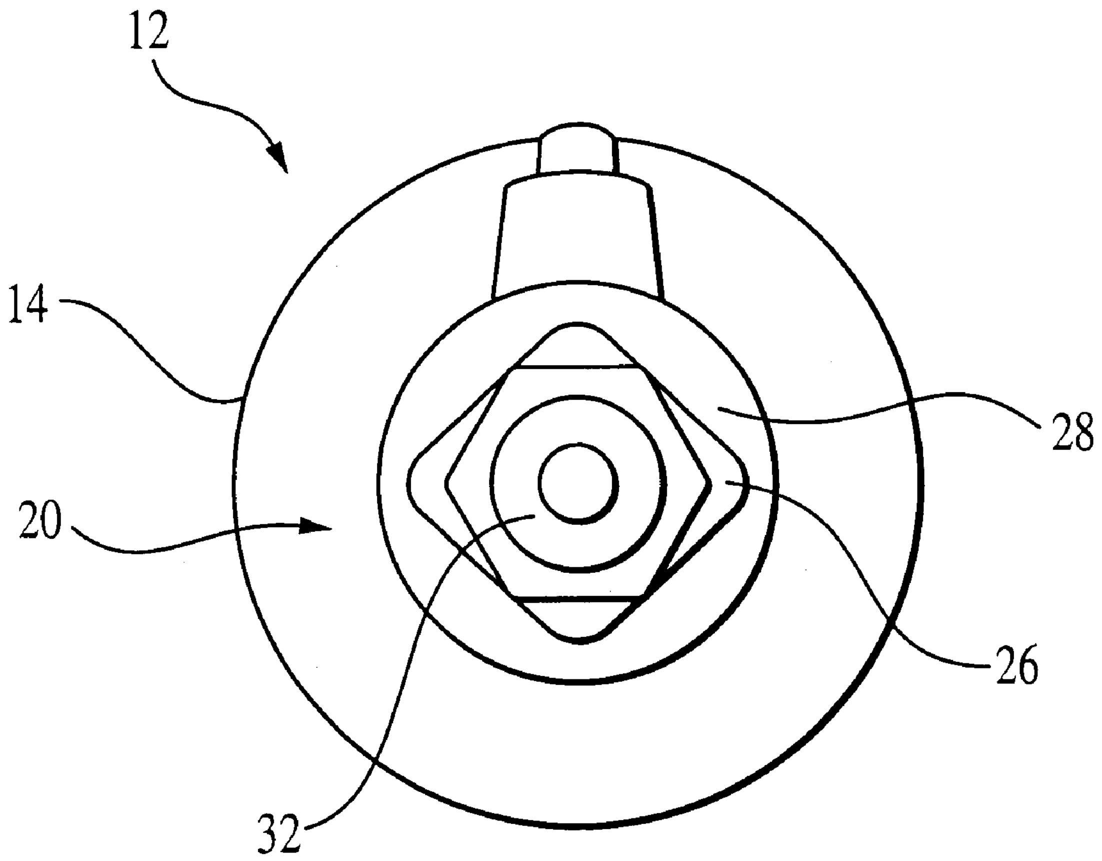
FIG. 3 is an end view of the operational end portion of the rotary hand tool, embodying the present invention.

Referring to FIG. 1, the present rotary tool with a quick release accessory attachment is generally designated at 10. The rotary tool alone is generally designated 12, and includes a housing 14 that encloses a motor (not shown). As shown in FIG. 2, the housing has a central axis designated A—A, a non-operational end portion 18 and an operational end portion 20.

Figure 4:
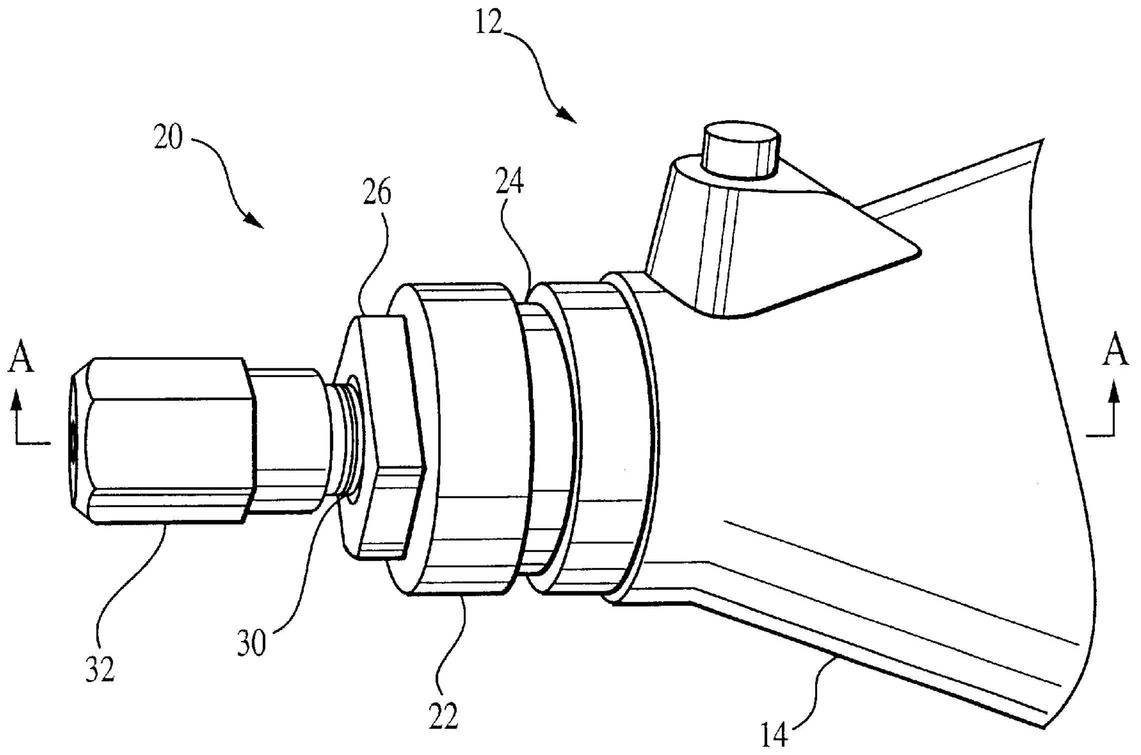
FIG. 4 is a predominately side view of the hand tool shown in FIG. 2.

As best shown in FIGS. 2 and 4, a nose portion 22 is formed at the operational end portion 20 and has an outer annular groove 24 disposed generally perpendicularly of the central axis A—A, and a non-circular element 26 at the outer end 28 thereof that is coaxial with the central axis. While it is preferred that the nose portion 22 be generally cylindrical in design, other designs for the nose portion are contemplated and may include any polygonal or oval shapes. In the preferred embodiment of the present invention, the non-circular element 26 is a square shaped extension, but it may be constructed in many non-circular shapes, including but not limited to any polygonal shape, star shape, oval, or plurality of teeth. An important consideration is that the shape be such that it can mate with a complementary shape of the accessory attachment to prevent relative rotational movement between the two.

A rotatable shaft 30 is connected to the motor along the central axis A—A, and a chuck 32, well known in the prior art, is connected to the rotatable shaft 30, and is used to hold different tools, such as a drill or other bit.

Figure 5:
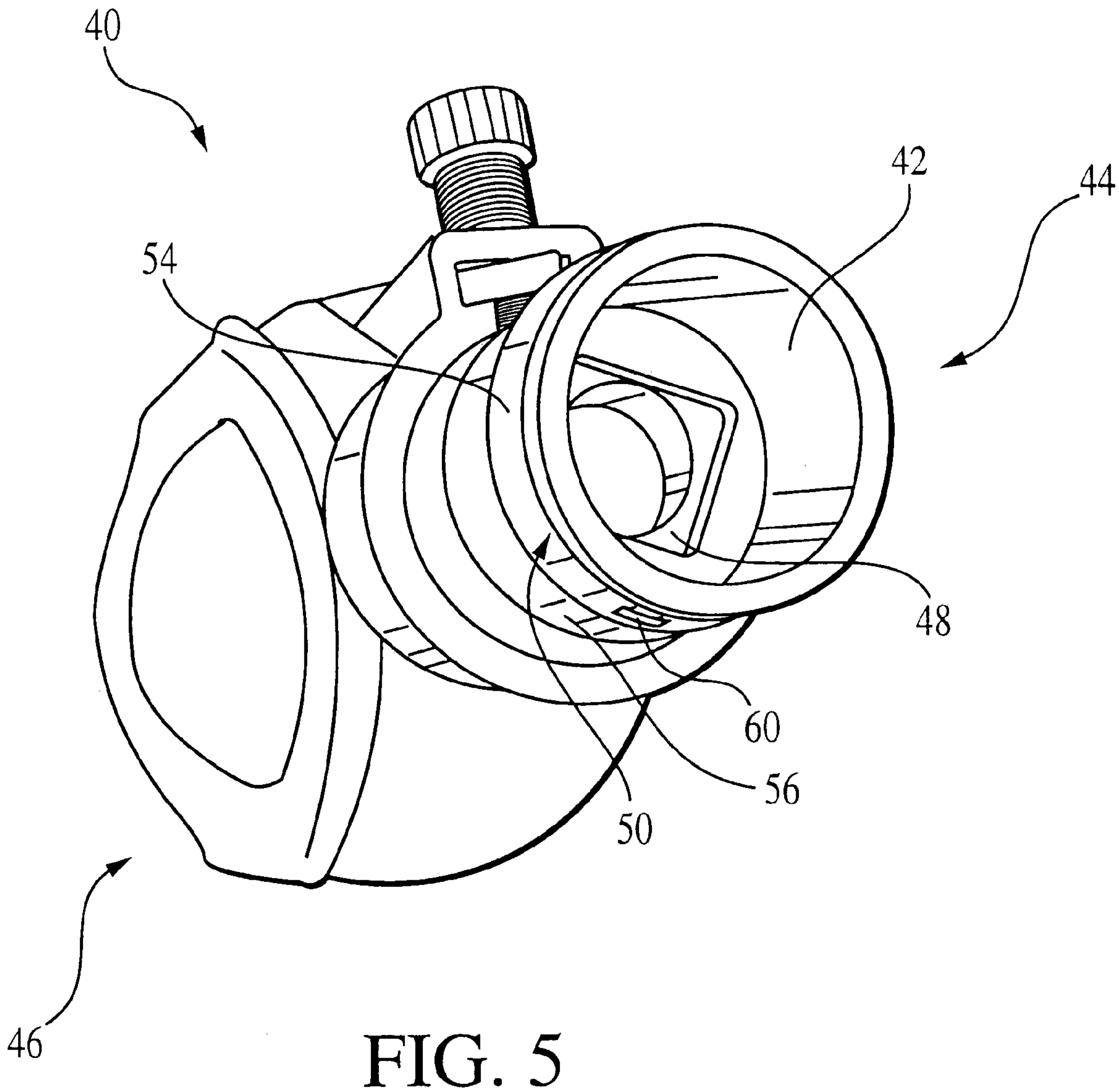
FIG. 5 is a perspective view of the present accessory attachment, which in this drawing is a grout removal guide.
Figure 6:
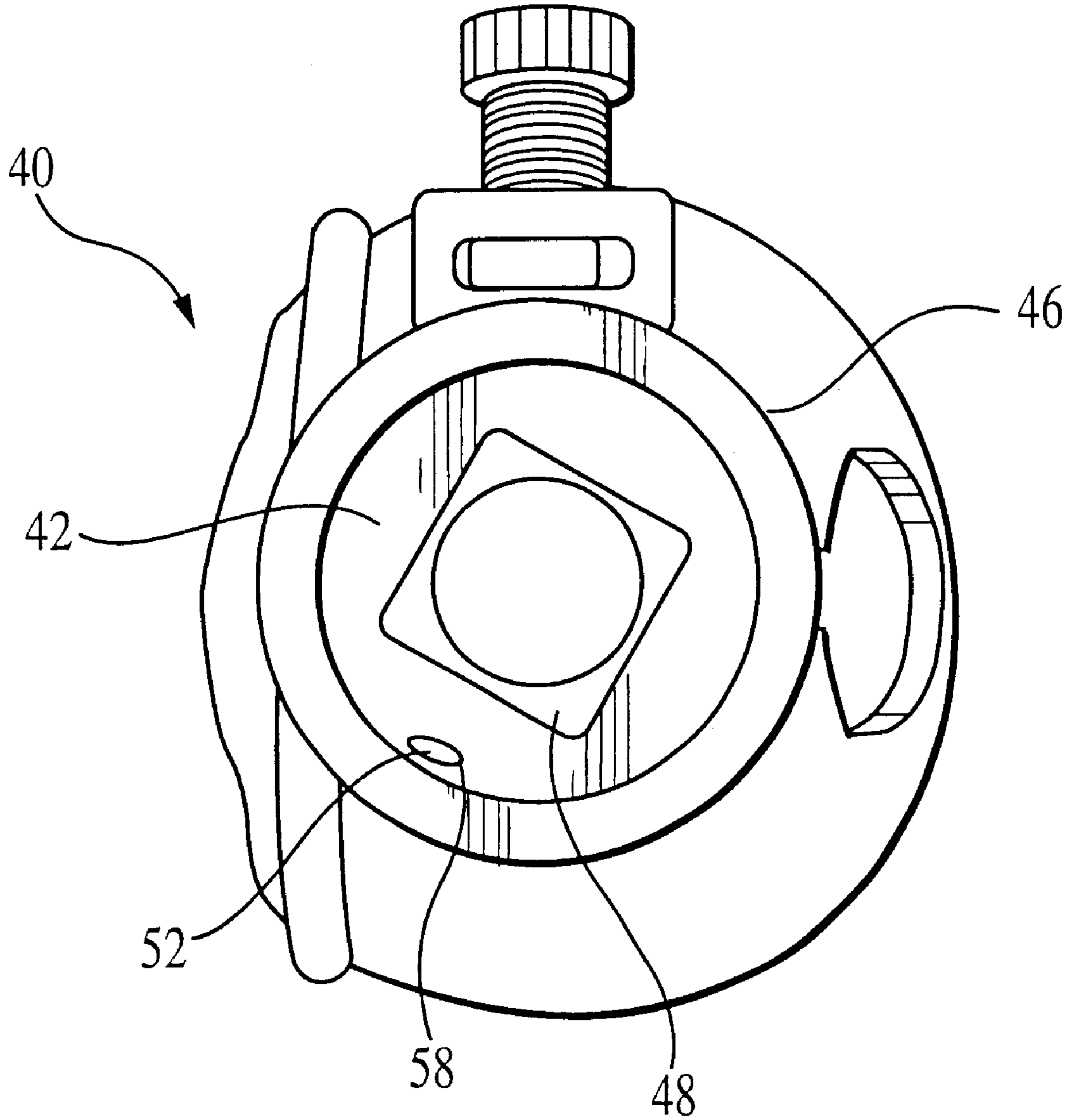
FIG. 6 is a view of the connection end portion of the accessory attachment shown in FIG. 5.

Referring to FIGS. 1 and 5, the present accessory attachment, indicated generally at 40, includes a cylindrical cavity 42, an mating and connection end portion 44 and a working end portion 46. As shown in FIG. 6, a non-circular mating element 48 formed in the cylindrical cavity 42 matingly engages the non-circular element 26 of the nose portion 22. In the preferred embodiment, the non-circular mating element 48 is a square shaped recess. However, the non-circular mating element 48 may be constructed in any non-circular shape, including but not limited to any polygonal shape, star shape, oval, or plurality of teeth. Importantly, the non-circular element 26 and the non-circular mating element 48 need to be complementary to each other to provide a keying feature. Having a keying feature with noncircular shapes such as these prevents rotation of the accessory attachment 40 relative to the rotary tool 12 and also provides precise alignment of the accessory attachment on the tool 12.

As the number of sides on the non-circular element 26 and non-circular mating element 48 increase, so does the number of possible positions to matingly engage the keying feature. The greater number of possible positions may make it easier and quicker to fit the accessory attachment 40 onto the rotary tool 12 because less jostling may be needed.

In another embodiment of the present invention (not shown), the nose portion 22 may have a non-circular mating element 26 that is a recess, and the central cavity 42 of the accessory attachment 40 has a non-circular mating element 48 that is an extension. This embodiment operates in a similar manner to the preferred embodiment, with the keying feature of the recess and extension preventing rotation of the accessory attachment 40 on the rotary tool 12.

Referring now to FIGS. 5 and 6, the accessory attachment 40 includes a biased mating and connection element 50 provided on the accessory attachment 40 facing the central cavity 42. In the preferred embodiment, the biased mating and connection element 50 is a spring-loaded ball 52 that is retained by a resilient split circular ring 54 that fits in an exterior annular recess 56 of the accessory attachment 40. The spring-loaded ball 52 is positioned in a hole 58 of the accessory attachment 40, whereby a contacting portion of the ball is exposed in the central cavity 42. The hole 58 is sized and shaped so that the ball cannot escape completely into the cavity 42. Also, the ring 54 has a hole 60 that is smaller than the diameter of the ball 52 and since the ball also fits in the hole 58 of the accessory attachment 40, the ring is prevented from rotating on the accessory attachment.

In operation, a user wanting to utilize an accessory accessory attachment 40, such as the grout guide, simply snaps the accessory attachment onto the rotary tool 12, so that the non-circular element 26 of the rotary tool matingly engages the non-circular mating element 48 of the accessory attachment, and the spring loaded ball 52 engages the annular groove 24, locking the accessory attachment in place. In this regard, the resilient ring 54 is adapted to move outwardly a sufficient distance so that the ball 52 can move away from the cavity 42 so that the accessory attachment 40 can be reinserted. When it is inserted the required depth, the ball 52 will engage the groove 24 and be locked in position. To disconnect the accessory attachment 40 from the rotary tool 12, the user pulls the accessory attachment away from the rotary tool, thereby disengaging the spring-loaded ball 52 from the annular groove 24. The present quick release attachment system is user friendly in that it allows the user to change accessory attachments 40 quickly and easily. Also, the mating feature of the non-circular elements 26 and 48 prevents the accessory attachment 40 from rotating relative to the tool housing 14 during operation of the rotary tool 12.

Figure 7:
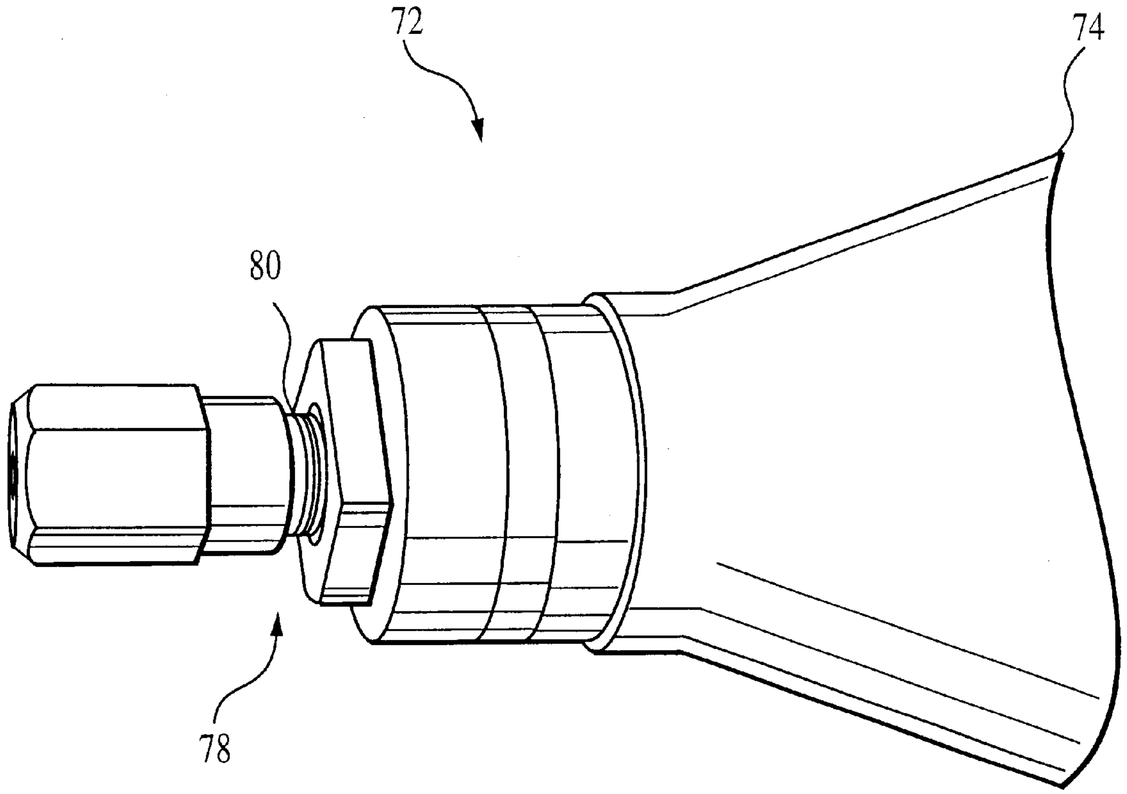
FIG. 7 PRIOR ART
FIG. 7 is a partial side view of a prior art rotary hand tool.

It is also contemplated that the present invention may be a quick release attachment adaptor, generally designated 70, that can be attached to the prior art rotary tool 72. As shown in FIG. 7, the rotary tool 72 includes a housing 74 enclosing a motor, the housing having a non-operational end portion 76 and an operational end portion 78 with threads 80 disposed thereon. The quick release attachment adaptor 70 would be adapted to connect to a rotary tool attachment 40, such as the one described above.

Figure 9:
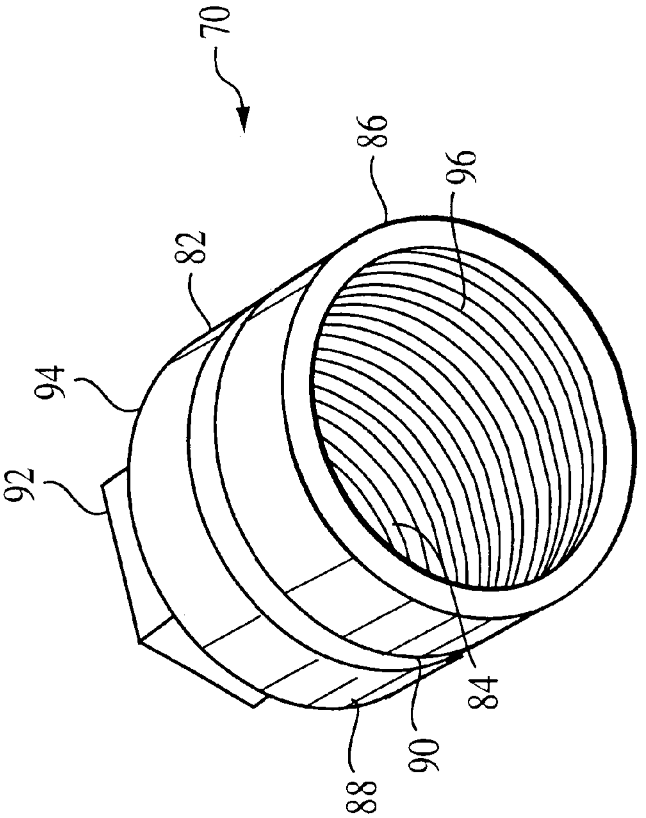
FIG. 9 is a predominately back view of the quick release attachment adaptor shown in FIG. 8.
Figure 8:
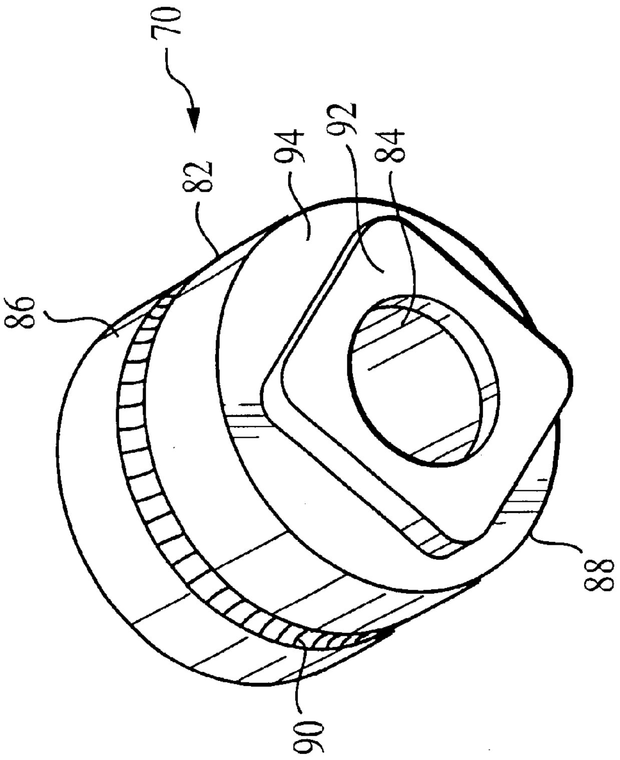
FIG. 8 is a predominately front view of a quick release attachment adaptor.

Referring to FIGS. 8 and 9, the quick release attachment adaptor 70 includes an adaptor base 82 having a central bore 84, a first end portion 86 and a second end portion 88, with the first end portion attaching to the operational end portion 78 of the rotary tool 72. It is preferred that the adaptor base 82 be generally cylindrical in design. An annular groove 90 disposed generally perpendicularly of the central bore 84 which matingly engages the biased mating and connection element 50. There is also a non-circular element 92 formed at the outer end 94 of the second end portion 88 parallel with the central bore 84. This non-circular element 92 matingly engages the non-circular mating element 48 of the attachment tool 40. All of the variations that were discussed above with regard to the non-circular element 26 are applicable here, as they may all be constructed on the quick release attachment adaptor.

The central bore 84 has threads 96 disposed thereon, so that in operation the user would screw the quick release attachment adaptor 70 onto the threads 80 of the rotary tool 72. Once in position, the user may then snap-fit the attachment tool 40 on the quick release attachment adaptor 70 in the same manner as described above.

Figure 10:
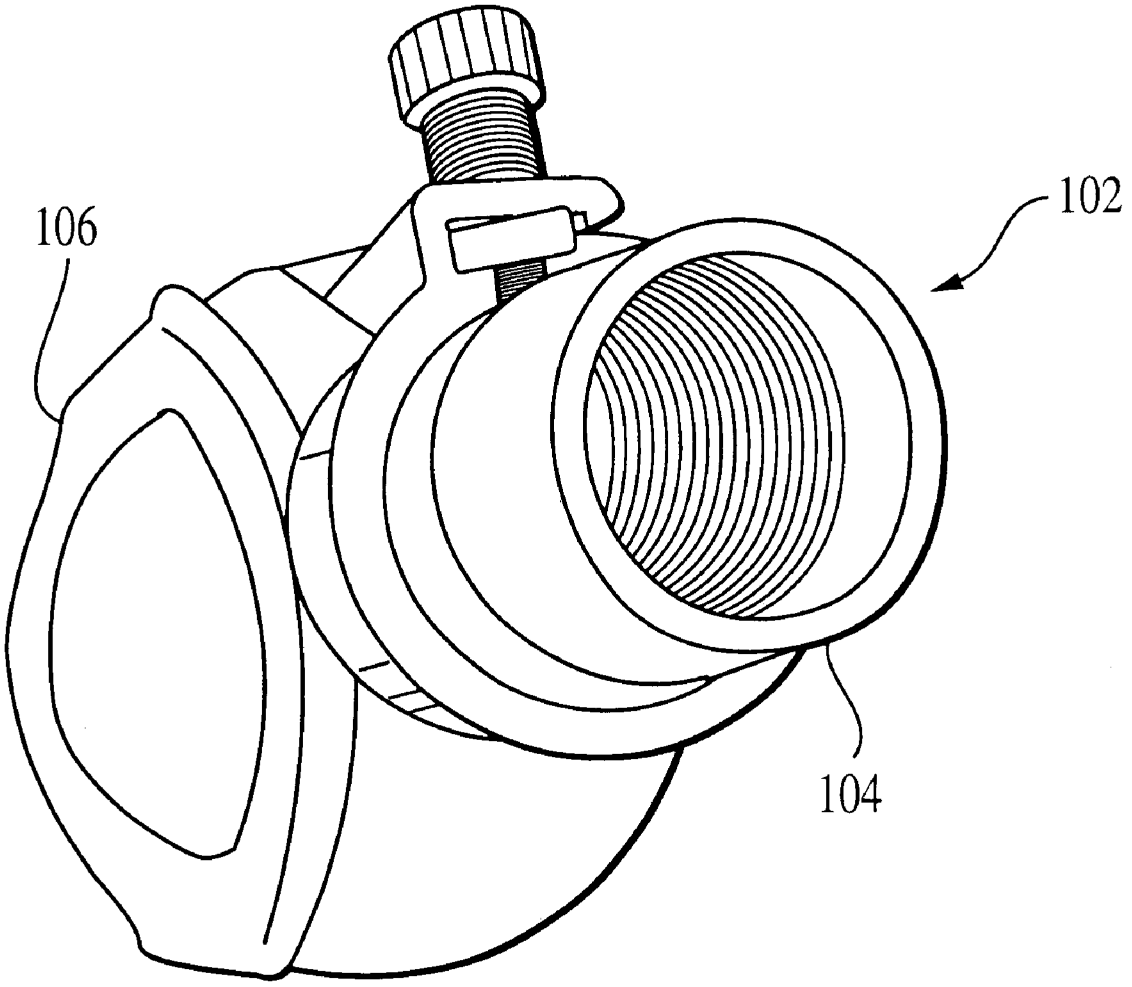
FIG. 10 is a perspective view of a prior art accessory attachment, which in this drawing is a grout removal guide; and, FIG. 11 is a perspective view of a quick release attachment adapter for the prior art accessory attachment shown in FIG. 10.

Another embodiment of the present invention is a quick release attachment adaptor for a rotary tool attachment, which is generally designated 100. Referring to FIG. 10, a prior art attachment tool 102 includes a threaded end portion 104 and a working end portion 106. The quick release attachment adaptor for the attachment tool 100 is adapted to connect to a rotary tool 12, as shown in FIG. 2 and previously discussed. Now referring to FIG. 11, included in the quick release attachment adaptor for the attachment tool 100 is an attachment adaptor base 108 having a central cavity 110, a first end portion 112 and a second end portion 114. It is preferred that the attachment adaptor base 108 be generally cylindrical. The first end portion 112 is attached to the threaded end portion 104 of the attachment tool 102.

A non-circular mating element 116 formed in the central cavity 110 matingly engages the non-circular element 26 of the rotary tool 12. All of the variations that were discussed above with regard to the non-circular mating element 48 are also applicable here, as they may all be constructed on the quick release attachment adaptor for the attachment tool 100.

Also included on the quick release attachment adaptor for the attachment tool 100 is a biased attachment element 118 provided on the attachment adaptor base 108 facing the central cavity 110. This biased attachment element 118 is a spring loaded ball, which is preferably the same as the spring loaded ball 52 discussed above, and therefore the details of the spring loaded ball 52 are applicable.

Figure 11:
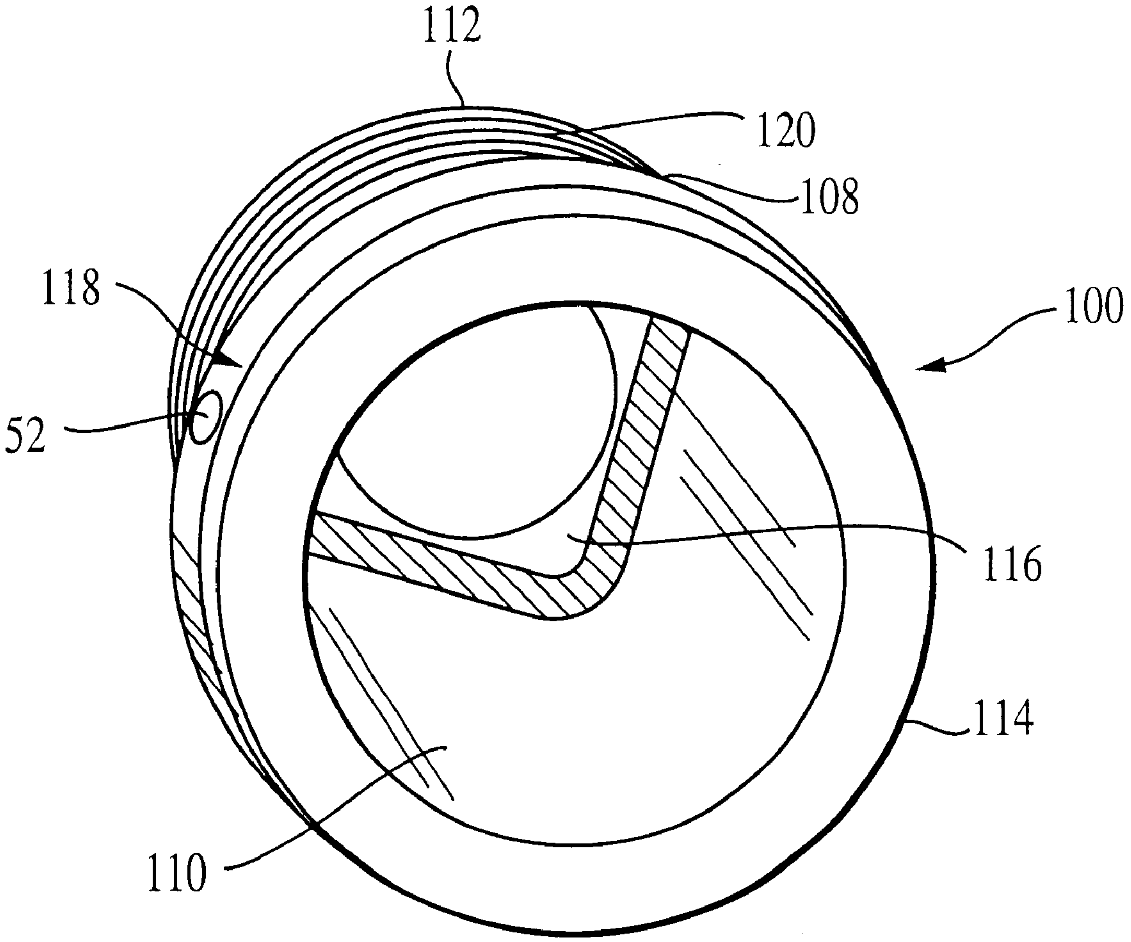

Still referring to FIG. 11, the attachment adaptor base 108 has threads 120 disposed thereon near the first end portion 112, so that the user may screw the quick release attachment adaptor 100 onto the attachment tool 102. Once in position, the user may then snap-fit the combined attachment tool 102 and quick release attachment adaptor 100 on the rotary tool 12, in the same manner as described above. A user may also place the quick release attachment adaptor 70 on the rotary tool 72, and also place the quick release attachment adaptor 100 on the attachment tool 102 to use the quick release attachment system.

From the foregoing it should be appreciated that an improved quick release attachment system has been shown and described which has many desirable advantages and attributes. The system provides a quick engage/disengage feature that is user friendly, and prevents rotation of the accessory attachment relative to the tool body during use.

While a particular embodiment of the quick release attachment tool has been shown and described, it will be appreciated by those skilled in the art that changes and modifications may be made thereto without departing from the invention in its broader aspects and as set forth in the following claims.

Various features of the invention are set forth in the appended claims.

What is claimed is:

1. A rotary tool with a quick release attachment tool, wherein the rotary tool comprises:

a housing which encloses a motor, said housing having a central axis, a non-operational end portion and an operational end portion;

a non-rotating generally cylindrical nose portion formed at said operational end portion, said nose portion having a front end face and an outer annular groove disposed generally perpendicularly of said axis, said nose portion having a non-circular element at the outer end thereof on said front face, said non-circular element being parallel with said central axis; and, a rotatable shaft connected to said motor and being located along said central axis;

said attachment tool comprises:

a central cavity and an attachment end portion and a working end portion;

a non-circular mating element formed in said central cavity that matingly engages said non-circular element; and, a biased connection element provided on said attachment tool, and engaging said annular groove when said attachment tool is fitted onto said rotary tool.

2. The tool of claim 1 wherein said nose portion is generally cylindrical.

3. The tool of claim 1 wherein said non-circular element is polygonally shaped, and said non-circular mating element is polygonally shaped.

4. The tool of claim 1 wherein said non-circular element is an extension, and said non-circular mating element is a recess.

5. The tool of claim 1 wherein said biased connection element is a spring loaded ball.

6. The tool of claim 5 wherein said spring loaded ball is attached to a split circular ring having a rectangular cross section that grasps an exterior surface of said attachment tool, and said spring loaded ball fits into a hole of said attachment tool, whereby a contacting portion of said spring loaded ball is exposed in said central cavity.

7. A quick release attachment adaptor for a rotary tool which includes a housing enclosing a motor, the housing having a non-operational end portion and an operational end portion, said quick release attachment adaptor being adapted to connect to a rotary tool accessory attachment which includes a central cavity, an attachment end portion and a working end portion, the central cavity having a non-circular mating element and a biased connection element, said quick release attachment adaptor comprising:

a non-rotating adaptor base having a central bore, a first end portion and a second end portion with an end face, said first end portion being adapted to be attached to the operational end portion of the rotary tool;

an annular groove disposed generally perpendicularly of said central bore in the outer surface of said adaptor base and being adapted to matingly engage the biased connection element; and, a non-circular element formed at the outer end of said second end portion parallel with said central bore on said end face, said non-circular element being adapted to matingly engage the non-circular mating element of the attachment tool.

8. The adaptor of claim 7 wherein said non-circular element is polygonally shaped.

9. The adaptor of claim 7 wherein said non-circular element is an extension.

10. A quick release attachment adaptor for a rotary tool accessory attachment which includes an attachment end portion and a working end portion, said quick release attachment adaptor being adapted to connect to a rotary tool having a housing which encloses a motor, the housing having a non-operational end portion and an operational end portion, and having a nose portion formed at said operational end portion, the nose portion having a non-circular element at the outer end and an annular groove disposed thereon adjacent said outer end, said quick release attachment adaptor comprising:

a non-rotating attachment adaptor base having a central cavity, a first end portion having an inside end surface in said central cavity and a second end portion, said first end portion being adapted to be attached to the attachment end portion of the rotary tool accessory attachment;

a non-circular mating element formed on said inside end surface in said central cavity adapted to matingly engage said non-circular element of the rotary tool; and a biased connection element provided on said attachment adaptor base, and being adapted to engage the annular groove when said attachment adaptor base is fitted onto the rotary tool.

11. The adapter of claim 10 wherein said biased connection element is a spring loaded ball.

12. The adaptor of claim 7 wherein said central bore has threads disposed thereon to screw onto the threads on the operational end portion of the rotary tool.

13. The adaptor of claim 7 wherein said adaptor base is generally cylindrical.

14. The adapter of claim 11 wherein said spring loaded ball is attached to a split generally circular ring having a rectangular cross section that fits in an exterior recess of said attachment adapter base, and said spring loaded ball fits into a hole of said attachment adapter base, whereby a contacting portion of said spring loaded ball is exposed in said central cavity.

15. The adaptor of claim 10 wherein said non-circular mating element is polygonally shaped.

16. The adaptor of claim 10 wherein said non-circular mating element is an extension.

17. The adaptor of claim 10 wherein said central cavity has threads disposed near said first end portion to screw onto the threads on the operational end portion of the rotary tool attachment.

18. The adaptor of claim 10 wherein said attachment adaptor base is generally cylindrical.

* * * * *